(12) United States Patent
Miner et al.

(10) Patent No.: US 9,509,601 B2
(45) Date of Patent: Nov. 29, 2016

(54) DEVICE DRIVER FOR A SOFTWARE ROUTER

(71) Applicant: Cisco Technology, Inc., San Jose, CA (US)

(72) Inventors: James J. Miner, Morrisville, NC (US); Stan Ratliff, Raleigh, NC (US); Walter L. Robinson, Sunnyvale, CA (US); Thomas Berry, Holly Springs, NC (US); Hope Mills, Raleigh, NC (US); Steve Klein, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 13/827,550

(22) Filed: Mar. 14, 2013

(65) Prior Publication Data

US 2014/0122678 A1 May 1, 2014

Related U.S. Application Data

(60) Provisional application No. 61/721,272, filed on Nov. 1, 2012.

(51) Int. Cl.
| | |
|---|---|
| *G06F 15/173* | (2006.01) |
| *H04L 12/771* | (2013.01) |
| *H04W 4/04* | (2009.01) |
| *H04L 12/773* | (2013.01) |
| *H04L 12/26* | (2006.01) |
| *H04L 29/08* | (2006.01) |
| *H04L 12/24* | (2006.01) |

(52) U.S. Cl.
CPC ............... *H04L 45/56* (2013.01); *H04L 45/60* (2013.01); *H04L 67/12* (2013.01); *H04W 4/046* (2013.01); *H04L 41/0803* (2013.01); *H04L 43/0811* (2013.01); *H04L 67/34* (2013.01)

(58) Field of Classification Search
CPC ........................... H04L 45/56; H04L 43/0817
USPC .................................................. 709/238, 224
See application file for complete search history.

(56) References Cited

U.S. PATENT DOCUMENTS

| | | | |
|---|---|---|---|
| 6,510,164 B1* | 1/2003 | Ramaswamy et al. | 370/466 |
| 2009/0092057 A1* | 4/2009 | Doctor | G06F 21/56 370/252 |
| 2012/0102576 A1* | 4/2012 | Chew | 726/30 |

(Continued)

OTHER PUBLICATIONS

Rosenberg, "A Framework for Application Interaction in the Session Initiation Protocol (SIP)," draft-ietf-sipping-app-interaction-framework-05, SIP, Internet-Draft, Jul. 18, 2005, pp. 1-39.

(Continued)

*Primary Examiner* — Jason Recek
(74) *Attorney, Agent, or Firm* — Edell, Shapiro & Finnan, LLC

(57) ABSTRACT

The embodiments described herein provide mechanism that allows an embedded router software image to run in the user application memory space of a general purpose computer. An interface process is provided to receive and transmit packets between the user application memory space and the operating system's protected or kernel memory space of the general purpose computer. The interface process mimics or emulates any hardware interfaces that would be available to the router software when running on a dedicated embedded router device.

20 Claims, 8 Drawing Sheets

(56) References Cited

U.S. PATENT DOCUMENTS

| | | | |
|---|---|---|---|
| 2012/0246704 A1* | 9/2012 | Dorsey et al. | 726/4 |
| 2013/0254264 A1* | 9/2013 | Hankinson et al. | 709/203 |
| 2014/0029617 A1* | 1/2014 | Wang et al. | 370/392 |
| 2014/0122727 A1 | 5/2014 | Miner et al. | |

OTHER PUBLICATIONS

Netronome, "Scaling Network Appliance Performance," Netronome White Paper, www.netronome.com, Apr. 2011, pp. 1-6.

* cited by examiner

DEVICE DRIVER FOR A SOFTWARE ROUTER

CROSS REFERENCE TO RELATED APPLICATION

This application claims the benefit of U.S. Provisional Patent Application No. 61/721,272, filed Nov. 1, 2012, the entirety of which is incorporated herein by reference.

TECHNICAL FIELD

The present disclosure relates to operating an embedded router software image on a multi-purpose computing device.

BACKGROUND

Mobile devices may travel together in groups, e.g., when users of the mobile device are traveling in an automobile or other vehicle. The mobile devices receive voice and data by way of a wireless service provider such as AT&T™ or VERIZON™. When the mobile communication device is a dedicated component in the vehicle, the vehicle may be referred to as a "connected vehicle." In such environments, each mobile device or vehicle has a dedicated communication channel for communication with a roadside unit or a cellular base station. In a similar mobile application, an Airline may wish to provide WiFi® services to their passengers or emergency teams, e.g., police and fire fighting teams, may require mobile or portable connectivity to a network such as the Internet. The emergency teams may also employ wired connections within an on-site command post.

In the above-described environments, it may be desirable to use a limited number of connections, e.g., one or two, to provide network connectivity to various individuals in a collection of users such as a firefighting team or airline passengers aboard a flight. In order to provide network connectivity when the number of users exceeds the number of physical network connections it may be desirable to employ a router. By way of example, a router in an automobile may use the automobile's connected vehicle connection to route services to the automobile's occupants in lieu of each occupant having an individual network connection.

DESCRIPTION OF EXAMPLE EMBODIMENTS

Overview

The embodiments described herein provide a mechanism that allows an embedded router software image to run in the user application memory space of a general purpose computer. An interface process is provided to receive and transmit packets between the user application memory space and the operating system's (OS's) protected or kernel memory space of the general purpose computer. The interface process mimics or emulates any hardware interfaces that would be available to the router software when running on a dedicated embedded router device.

The techniques described herein provide for operating a software router in application memory space of a general purpose computer and operating an interface application in the application memory space of the general purpose computer. In operation, a packet is received by an operating system running on the general purpose computer. The packet is obtained or captured using the interface application. A hardware interface associated with the router application for transferring packets to and from the router application is emulated by the interface application, i.e., the hardware interrupts are provided by software. The software router is, in general, designed for operation on an embedded device and is not reconfigured for operation on the general purpose computer. After the packet is received by the interface application, a software receive interrupt is generated that is configured to emulate a hardware interrupt of the embedded device.

The general purpose computer is in communication with one or more of a local area network (LAN), a mobile LAN, personal area network (PAN) and a wide area network (WAN) to provide a flexible communication architecture for operating a software router, whether or not any of the network connections of the general purpose computer are wired or wireless.

EXAMPLE EMBODIMENTS

Figure 1:
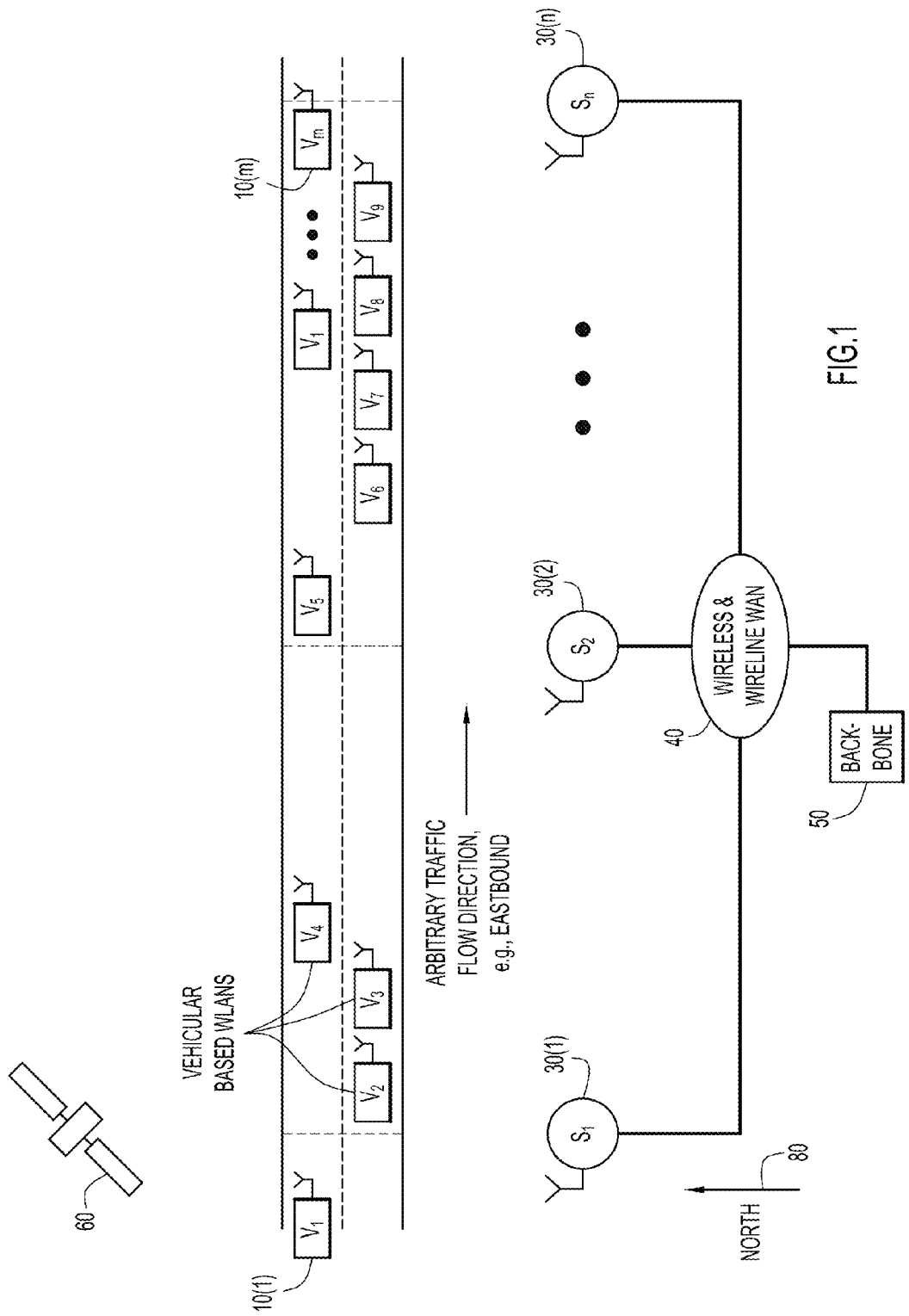
FIG. 1 is a system level diagram showing vehicles employing a software router according the techniques described herein.

Referring first to FIG. 1, a system level block diagram is shown comprising vehicle in vehicles $V_1$-$V_m$ enumerated as 10(1)-10(m), each vehicle including a software router; wireless stations or access points $S_1$-$S_n$, enumerated as 30(1)-30(n); a network 40; a service provider network backbone 50; and an optional satellite 60. The mobile software routers 10 may be running on any general purpose computer, e.g., a small form factor personal computer (PC) running Linux or the Windows® OS with a wireless network interface. The wireless interface may be a broadband device embedded in a vehicle to obtain services provided via network 40 from a service provider associated with backbone 50. In this example, the vehicles $V_1$-$V_m$ are moving along a two lane roadway 60 of an otherwise larger highway (not depicted). The vehicles $V_1$-$V_m$ are moving in a common but arbitrary direction, e.g., Eastbound, in a North-up map orientation 80.

In one example, a service provider such as AT&T™ or VERIZON™ provides broadband services by way of stations $S_1$-$S_n$. Such services may include voice and data services. Within each vehicle $V_1$-$V_m$, there may be one or more mobiles devices. For example, a family or group of co-workers may be travelling together. Accordingly, one or more mobile devices, e.g., mobile phones or tablet computers may be present in each vehicle $V_1$-$V_m$.

One issue that service providers face, absent the mobile router mechanism described herein, is that each mobile device in vehicles $V_1$-$V_m$ is considered an individual entity by the service provider in that wireless traffic exchanged between the mobile devices and the stations 30 or satellite 60 are unicast. Unicast voice and data requires that network packets be sent individually to each mobile device. As the number of subscribers continues to grow, this system is forced to scale linearly with the number of subscribers. However, by virtue of the techniques described herein, all mobile devices in any given vehicle may receive voice and data services via a single router in the vehicle, thereby allowing a single connection with a vehicle at least with respect to some broadband or network services, as described hereinafter.

Each vehicle's router may be an "always-on" mobile broadband device. In such a paradigm, the always-on mobile broadband connection is used for providing a variety of services including voice and data services, e.g., phone calls, email, web browsing, etc., and may also provide location services such as available local services or traffic reports.

The backbone 50 may include various servers, suitably placed in a metropolitan (metro) data center for instance, to provide service to the various mobile devices. Accordingly, and as an example, a single unicast connection between the service provider and the mobile router can carry packet traffic for all of the mobile devices in any given vehicle, thereby saving base station or satellite resources. The same techniques may be employed in other environments such as military small unit deployment or for police, fire, or medical teams, as described in connection with FIG. 3 below.

In order to facilitate certain mobility situations, a mobility handoff message may be employed when a mobile unit transitions from one station to another. For example, as part of mobile network design, each station, e.g., each of $S_1$-$S_n$, may have a different controller unit or system controller (not shown). The handoff messages employed between stations may include transition information from one controller to another, e.g., a server which may also conveniently act as the controller for network 40. In this regard, network 40 may also include the associated stations and servers.

Accordingly, messages within network 40 between controllers may include information that may be used to identify network control information for individual vehicles and their transition from one server or station to another. For example, a mobility handoff message may include information comprising a Virtual Local Area Network (VLAN) identifier (ID), or a unique network ID (e.g., a bridge domain ID). In this regard, mobile devices may be part of a VLAN or Virtual Private Network (VPN) that is facilitated by the features included in software routers 10.

Figure 2:
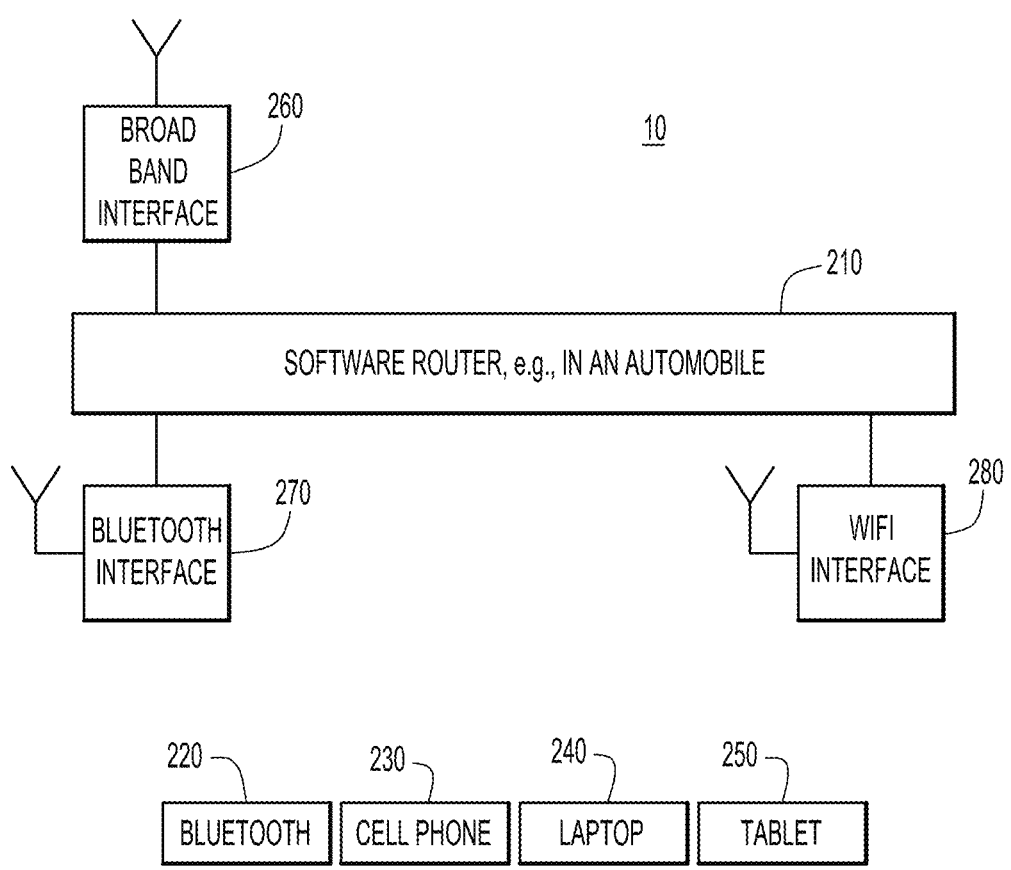
FIG. 2 is an example block diagram of a software router servicing a plurality of mobile devices traveling together in a vehicle.

Referring to FIG. 2, a block diagram is shown for a software router 210 that is servicing a plurality of mobile devices traveling together in one of the vehicles 10. The router 210 has a broadband wireless interface 260 for communication with a base station, a WiFi interface 280, and may include a Bluetooth® interface 270, for communicating with wireless devices in a given vehicle, e.g., one of vehicles 10. Accordingly, a vehicle based Wireless Local Area Network (WLAN) may be formed inside a vehicle using software router 210. The software router 210 routes packets to and from a Bluetooth device 220, cell phone 230, laptop 240, and/or personal tablet device 250. In this manner, software router 210 enables a mobile WLAN with capability that is similar to home or office WLAN.

Furthermore, by using a router software image that was developed for an embedded router, router technology developed over decades is leveraged for mobile WLANs and for operation on a general purpose computer. For example, the latest in VPN, VLAN, Quality of Service (QoS), network security, aggregation services, integrated services, etc., technology of an embedded router becomes deployable on a general purpose computer with little or no modification of the embedded router software image for a specific or custom piece of hardware. For example, minimal modification may include a software image build for a specific processor suite such a commonly used x86 or reduced instruction set processors. The software router build can therefore be distributed as a binary executable without divulging the source code developed over decades. The software router may be operated as a virtual machine (VM), e.g., via a hypervisor.

Since the router software image was developed for an embedded device, the executing router software image "expects" to have certain hardware interfaces be available for operation. To this end, a router software wrapper or co-executing interface process is executed to simulate, mimic, or otherwise serve in lieu of such "expected" hardware interfaces. The operation of the interface process is described in greater detail in connection with FIGS. 4-6.

Figure 3:
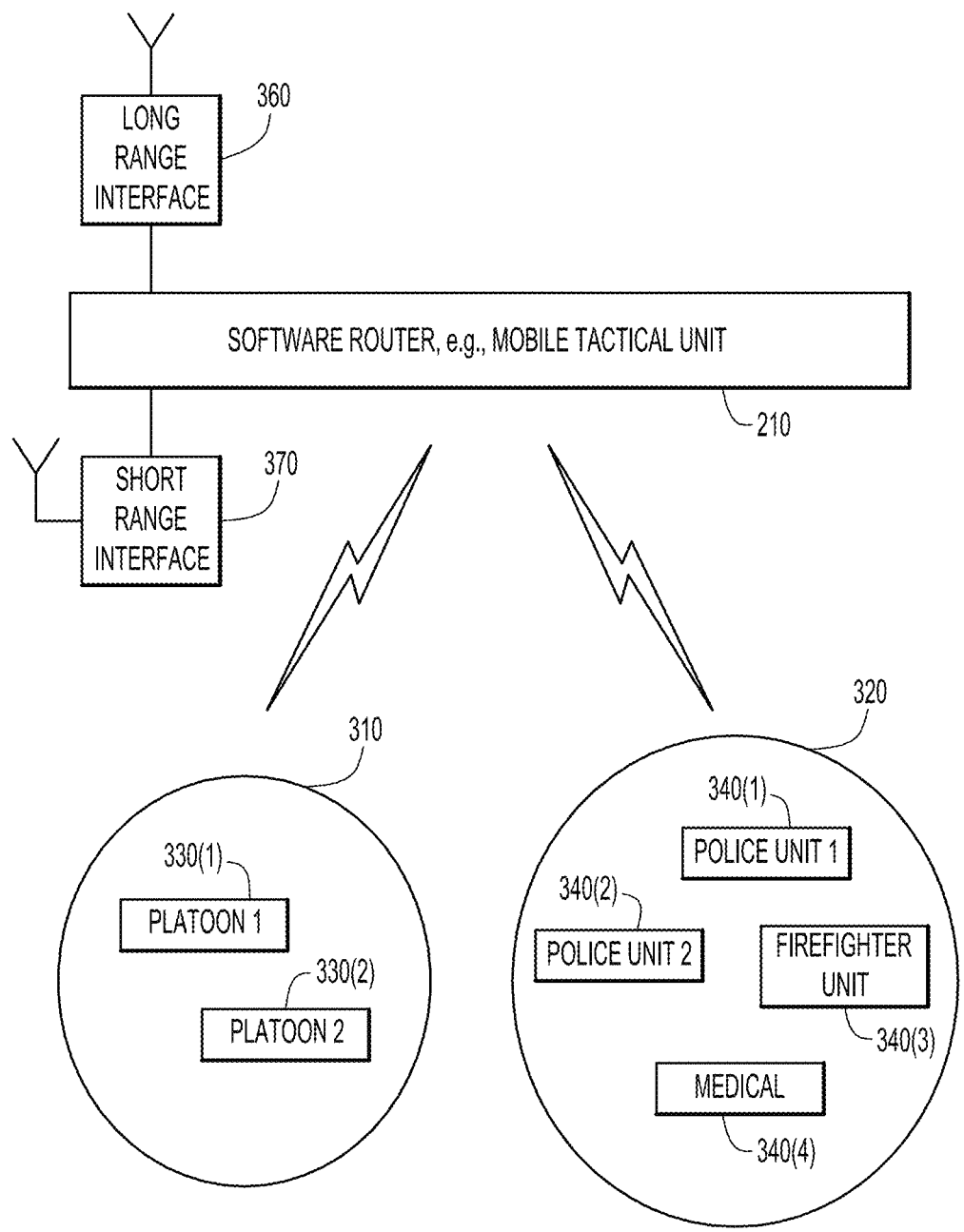
FIG. 3 is an example block diagram of a software router servicing a plurality of mobile devices that are part of a tactical unit.

Turning to FIG. 3, an example block diagram is shown for a software router servicing a plurality of mobile devices that are part of a tactical unit. In this example, software router 210 routes packets for two example tactical units 310 and 320; not necessarily at the same time or in the same geographic region. Tactical unit 310 may be a small military unit, e.g., two ground platoons 330(1) and 330(2), or tactical unit 320 may be an emergency response team that has two police units 340(1) and 340(2), a firefighter unit 340(3), and a medical team 340(4).

To facilitate communication, a longer range radio frequency (RF) interface 360 may be provided to communicate over a private or secure military RF band, or a public service band. In turn, a shorter range RF interface is provided to supply WLAN services to tactical units 310 or 320. The shorter range RF interface 370 may use an RF band assigned for such communication, and employ secure communication according to the needs of the tactical units. Software router 210 may be deployed in a small portable device that may be part of a command post servicing teams 310 or 320.

Figure 4:
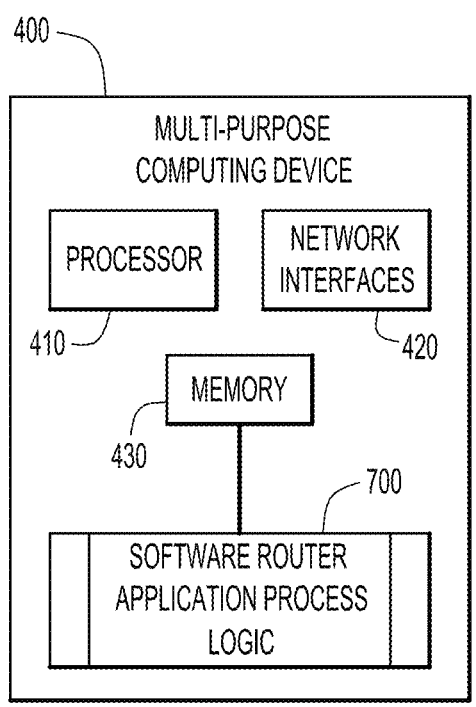
FIG. 4 is an example block diagram of a software router depicted in FIGS. 2 and 3 running on a general purpose computing device.

Turning now to FIG. 4, an example of a block diagram of a general purpose computer 400 configured to execute a software router, e.g., software router 210 shown in FIGS. 2 and 3. The diagram of FIG. 4 is representative of the general structure of any computer, e.g., associated with vehicles or tactical units described in connection with FIGS. 1 and 3. The general purpose computer 400 comprises a processor 410, memory 430, and a network interface device(s) or unit(s) 420 (e.g., wireline network and RF interfaces). The network interface device 420 sends and receives packets from the various user devices, e.g., operating within vehicles $V_1$-$V_m$, using an RF interface. Accordingly, interface device 420 may employ wireless local area network (WLAN) or wireless wide area network (WWAN) technology, e.g., 3G, 4G, EDGE, LTE, etc., and may also employ standard wired Ethernet network connectivity. The processor 410 is, for example, a microprocessor, microcontroller, digital signal processor or other similar data processor configured for a general purpose computer.

The memory 430 may comprise read only memory (ROM), random access memory (RAM), magnetic disk storage media devices, optical storage media devices, flash memory devices, electrical, optical, or other physical/tangible (non-transitory) memory storage devices. The memory 430 stores executable software instructions for software router application processes logic 700. Plural processes may be employed to encompass the native software router process(es) and any other interface or wrapper application or process that facilitates the routing of packets in and out of the general purpose computer 400. Thus, the memory 430 may comprise one or more computer readable storage media encoded with software comprising computer executable instructions and when the software is executed operable to perform the operations described herein for the process logic 700.

The processor 410 executes the process logic 700 in order to provide routing services, executed by the general purpose computer, based on router software source code developed for an embedded device, where the router software source code is not modified for operation on the general purpose computer 400. Process logic has been described generally above in the context of a few specific use-case scenarios and will be described with specific example operation details in connection with FIGS. 5-7.

Figure 5:
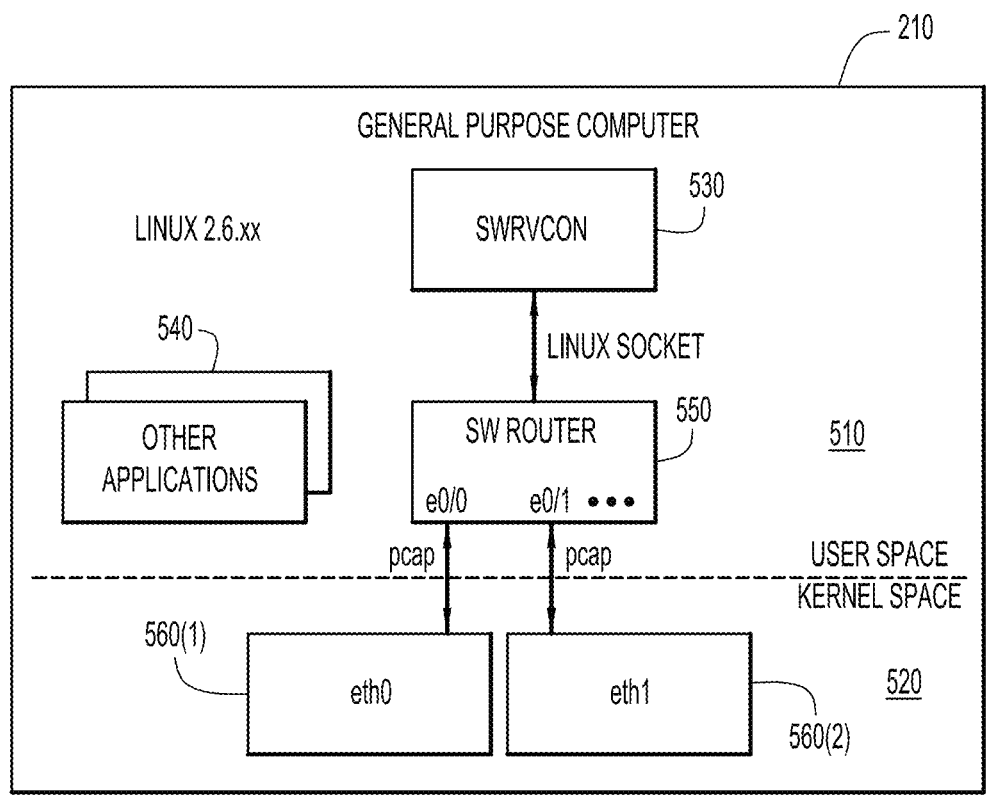
FIG. 5 is an example block diagram of software and interface components that may be used by a software router running on a general purpose computing device.
Figure 6:
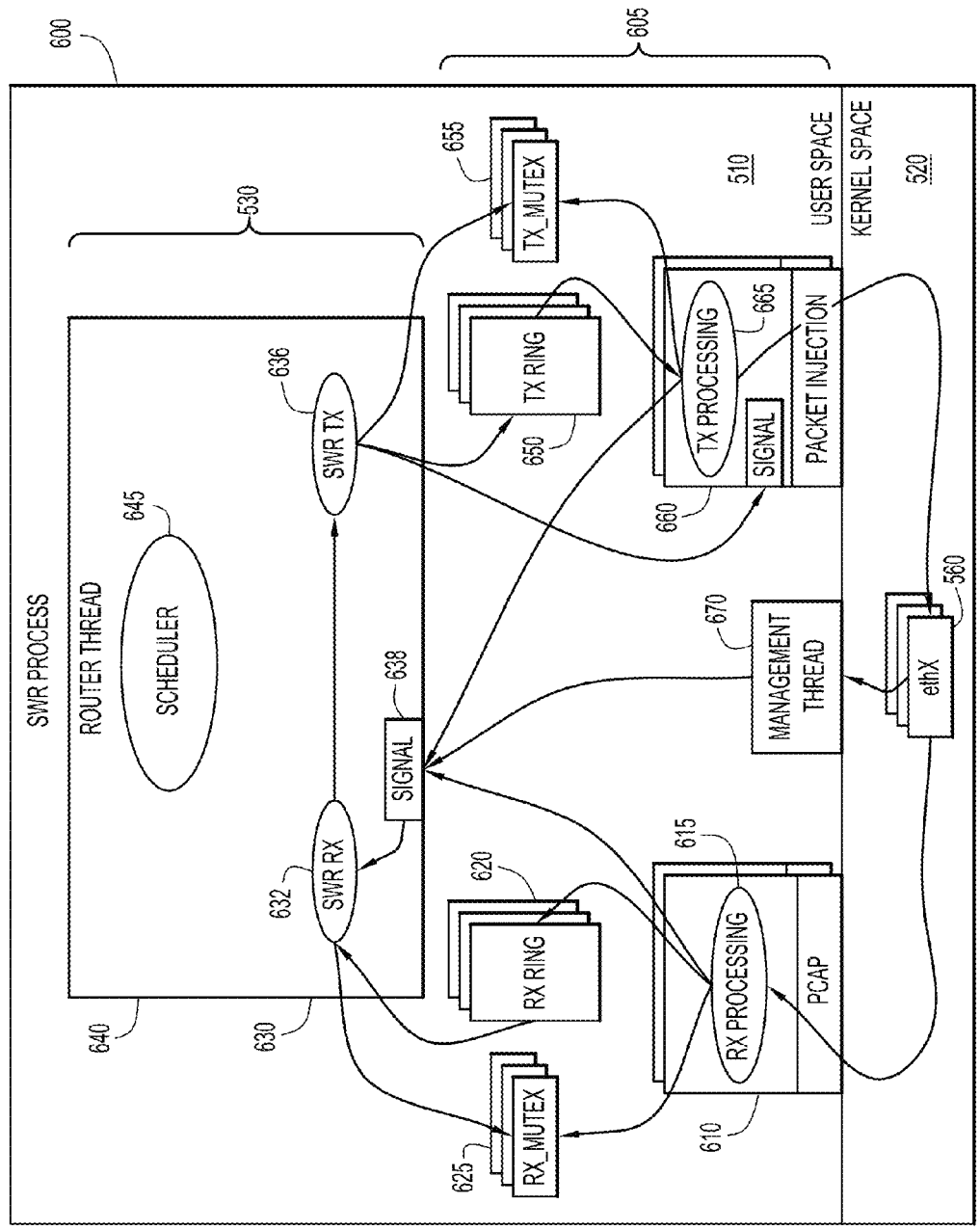
FIG. 6 is a more detailed example block diagram of the software components depicted in FIG. 5.

The basic operational environment for the techniques described herein has been described above and the next level of detail is provided by way of FIG. 5. FIG. 5 shows the software router 210 (FIG. 2) that is stored, e.g., in memory space 430 from FIG. 4 for a system housed in a vehicle, portable device, or general purpose computer, e.g., general purpose computer 400 that may use a processor with the Intel x86 architecture, and employs a generic OS such as Linux. In this example, the OS is Linux version 2.6 or greater, as indicated in FIG. 5. Memory 430 is divided by the OS into a user memory space 510 and a protected (by the OS) or kernel memory space 520. FIG. 5 depicts a high level of detail relative to FIG. 6 which depicts additional details. In this regard, FIG. 5 is for a single software router and a single software router virtual console (SWRVCON) process 530, while FIG. 6 depicts additional details with respect to the SWRVCON process 530.

Within the user memory space 510 are a SWRVCON 530, a software router 550, and other user space applications 540. Software router 550 has been ported from traditional embedded router device, e.g., manufactured by Cisco™, 3Com™, D-Link™, SMC™, Intel™, etc., that may be used in home, office, or data center applications. The console 530 is a small user space application that is delivered as part of the software router software distribution package that is released to a system integrator (SI) that ultimately provides a router hardware and software package for installation, e.g., in an automobile. The console 530 can be executed in a Linux shell/console to provide the SI with local console access to the software router application 550. The console application 530 communicates with the software router 550 using, e.g., a standard Linux or UNIX domain sockets.

Given that image used for the software router 550 is designed for an embedded device, it has interfaces that "expect" native hardware. In this example, the interfaces are enumerated as e0/0, e0/1, etc., for which a packet capture (pcap) application is provided in order to emulate the hardware interface expected by software router 550 for packet capture (ingress) and a packet injection (pinject) process is provided for packet egress. As described hereinafter, an interface application, process, or thread is developed to facilitate porting from the software router's native embedded device to a general purpose computer. In this depicted example, both pcap and pinject are used in this example to interface with the OS's kernel memory space 520 that includes Ethernet interfaces 560(1) and 560(2), labeled eth0 and eth1, respectively. It should be noted that various configuration and options files can be stored on the general purpose computer, e.g., for console command line options, memory configuration, startup scripts, etc.

Additional features of the techniques described herein may by applied to applications 540 which are co-located on the general purpose computer hosting software router 210. Co-located applications are applications running on the same hardware platform as the software router, e.g., software router 210. The co-located applications can exchange data among themselves by way of the co-located software router 210. In order facilitate inter-application communication one or more network taps (TAPs) interfaces may be instantiated, e.g., the Linux OS supports features referred to as TAP/TUN (network tap/tunnel) for virtual networking. In essence, the TAP interface simulates a link layer device, yet operates at the layer 2 level, e.g., the Media Access Control (MAC) layer, and can be used as a pipe between the co-located applications and the software router for inter-application network traffic. From the point of view of the co-located application, the TAP interface looked like just another IP interface and from the point of view of the software router, the TAP interface looks like a network interface. TAP may also be used to facilitate the networking operations described herein that are external to the general purpose computer.

As used herein, the terms "application," "routine," "process," "module," and "thread," may refer to a stand alone software application or process, or a functional unit thereof. These terms may be used interchangeably and refer to operations generally performed in software.

Example operations of the software router and software router interface application are described in connection with FIG. 6. A software router process 600 is described that operates in user memory space 510 and encompasses software router application 550 with the remaining components in user memory space 510 encompassing the interface application 605. The software router application 550 includes a router thread 630 for data plane processing (data plane processing may also be referred to as a fastpath process or thread). In other words, data plane processing is the complex of processing components associated with receiving packets on an ingress interface, deciding a forwarding address, and transmitting packets out an egress interface. The term "data plane" may also be used in contrast to the term "management plane". The management plane refers to the processing of packets specifically sent to the router in user space, as opposed to the forwarding of packets by way of a hardware router.

The interface components include receive (RX) processes or threads 610 and transmit (TX) processes or threads 660. RX thread 610 and TX thread 660, respectfully, act as a go between user memory space 510 and kernel space 520 to interface with kernel space interfaces, e.g., Ethernet interfaces (ethX) 560, for routing packets at the layer 2 level. A management process or thread 670 is provided to communicate signals between kernel space 520 and user memory space 510.

In this example embodiment, the software router process 600 is a Linux process. Each Linux process has a unique global memory space that is accessible by all threads within that process. With any Linux process, when multiple threads access the same data in global memory, care is taken to protect process global memory from corruption with protection tokens, semaphores or mutexes, e.g., RX mutexes 625 and TX mutexes 655. The software router application 550 runs as a single thread, and therefore it maintains the monolithic design used in a dedicate hardware router device. The design history of the software router application 550 for embedded router application would be both expensive and resource intensive to be adapted or customized, e.g., to be feasible for a low end or low performance market segment such as a vehicle based router.

The router thread 630 has a scheduler 645 configured to manage all events and process for software router application 550. All software router application 550 processes may be run at this level. Any packets that require additional processing may be handled by the router thread 630. The router thread 630 is an interrupt driven packet processing data plane. On a typical embedded router platform, hardware interrupts from hardwire network interface units would trigger packet processing events. However, on a general purpose computer these interrupts must be emulated in the software router process 600 by the interface application 605 since the software router application 550 resides in user memory space 510 and does not have the ability to receive a true network hardware interrupt.

To facilitate packet processing, the interface application 605 includes one or more RX and TX queues or rings 620 and 650. The RX rings 620 and TX rings 650 provide a storage buffer for packet processing. RX rings 620 and TX rings 650 are separate from any queues, e.g., QoS queues, that scheduler 645 may employ. The RX and TX rings are in global process memory and are protected by mutexes 625 and 655, respectively, since they may be accessed by more than one thread of the software router application 550. The interface application 605 is responsible for initializing RX rings 620 and TX rings 650, and clearing entries in the rings with empty packet buffers. The interface application 605 is also responsible for all cleanups of the RX and TX rings.

For the RX rings 620, the receive thread 610 fills in entries the RX rings with received packets as they are received (i.e., enqueued). The router thread component 630 then removes the entry (i.e., dequeued) from the RX ring, and places a free buffer into the ring in its place, and processes (i.e., routes) the packet. Once a route decision is reached, the router thread 630 fills in a TX ring entry 650 (enqueue) with the packet, and notifies the transmit thread 660 for packet transmission, whereby the transmit thread 660 dequeues the packet.

For ease of operation, an RX thread 610 and TX thread 660 may be operated on a per network interface. For example, an RX and TX thread may be instantiated or initialized for each hardware interface (e.g., one per network interface card (NIC)) or user space application interface. Each RX thread 610 waits in an idle state until, e.g., pcap has incoming packets. When packets arrive, the corresponding RX thread wakes up, and copies the packet into the next RX ring entry. Similarly, the TX threads 660 remain idle until the software router application 550 notifies them of work in their TX ring. When the software router application 550 places a packet into a TX ring, it notifies the TX thread (which awakens the thread) of work to do. The TX thread will then dequeue the packet from the TX ring, and send it to pinject in order to handoff the layer 2 packet from TX processing module 665 to one of the ethX interfaces 560. Upon completion of sending the packet, a TX complete notification is sent back to the software router application 550.

Management thread 670 may be an asynchronous process that monitors the state of each of the I/O interfaces and communicates the state changes with the software router thread 630. The management thread 670 is associated specifically with the process of monitoring physical interface line state, e.g., in an actual physical hardware router, but in a software router management thread 670 mirrors those states into the management plane. Management thread 670 periodically polls each interface, and reflects each state into the data structures within the software router. The TX threads 660 and the RX threads 610 do not monitor interface states, since for purposes of this example, these threads are to move packets.

Additional details of packet processing are provided in addition to those described above with respect to FIGS. 5 and 6. Specifically, since the software router application 550 is interrupt driven to obtain the proper performance and reliability, Linux signals can be used to interrupt the software router application 550 when RX packets are received (enqueued) and when TX complete notifications are sent from kernel space 520, or when interface management events occur, such as link up/down event occurs.

The lines with arrows in FIG. 6 indicate the life of a packet inside the software router process 600. The packet flow indicated by the arrowed lines is described briefly below. First, pcap receives a packet from the interface 560 and notifies the receive thread 610 that is bound to that interface. The receive thread 610 receives the packet using pcap functions for processing by the RX processing module 615, e.g., either via pcap_next call type of call, or a callback specified from, e.g., pcap_loop. RX processing module 615 performs a pthread_mutex_lock by way of RX_mutexes 625 to prevent the software router application 550 from accessing the particular RX ring 620 that the received packet will be enqueued. RX processing module 615 enqueues the packet into the corresponding RX ring 620. RX processing module 615 then performs a pthread_mutex_unlock to release the RX ring for access by the software router application 550.

RX processing module 615 issues a signal 638 that mimics an interrupt to software router application 550. A timer interrupt or other signal may also be used. Regardless of the mechanism, the software router application 550 scheduler process 645 is interrupted by signal 638. Control passes to software router RX routine 632. Software router RX routine 632 performs pthread_mutex_lock by way of RX mutexes 625 to prevent the RX processing module 615 from accessing the particular RX ring 620 in order to allow packet dequeue. A dequeue of the packet is performed by software router RX routine 632 and a pthread_mutex_unlock is performed to release the RX ring 620 for access. After a basic layer 2 packet check is performed, the packet is passed to software router TX routine 636 for routing.

Upon completion of routing, an output interface is determined, and standard output processing is performed, e.g., output features are applied and a layer 2 MAC address rewrite is performed, and the packet is passed to software router TX routine 636. The software router TX routine 636 performs a pthread_mutex_lock for the output interface mutex variable 655. The packet is then enqueued into the TX ring 650 of the output interface and the corresponding TX mutex 655 is unlocked. The software router TX routine 636 notifies the TX thread 660 for the corresponding interface of work to do by TX processing module 665, e.g., via a pthread condition variable or signal 638.

The TX thread 660 for the interface which waits in pthread_cond_wait state, is awakened to process the packet for transmission. The TX processing module 665 requests the pthread_mutex_lock 655 for the TX ring 650. Once granted, the TX processing module 665 dequeues the packet, and frees the lock 655 with a pthread_mutex_unlock. The packet is then sent to pinject, e.g., with a pcap_inject type of call. The pinject function then sends the packet via the Ethernet driver in the kernel. The TX processing module 665 signals the software router application 550 that the TX ring entry, and its associated buffers are free to be reused.

Figure 7:
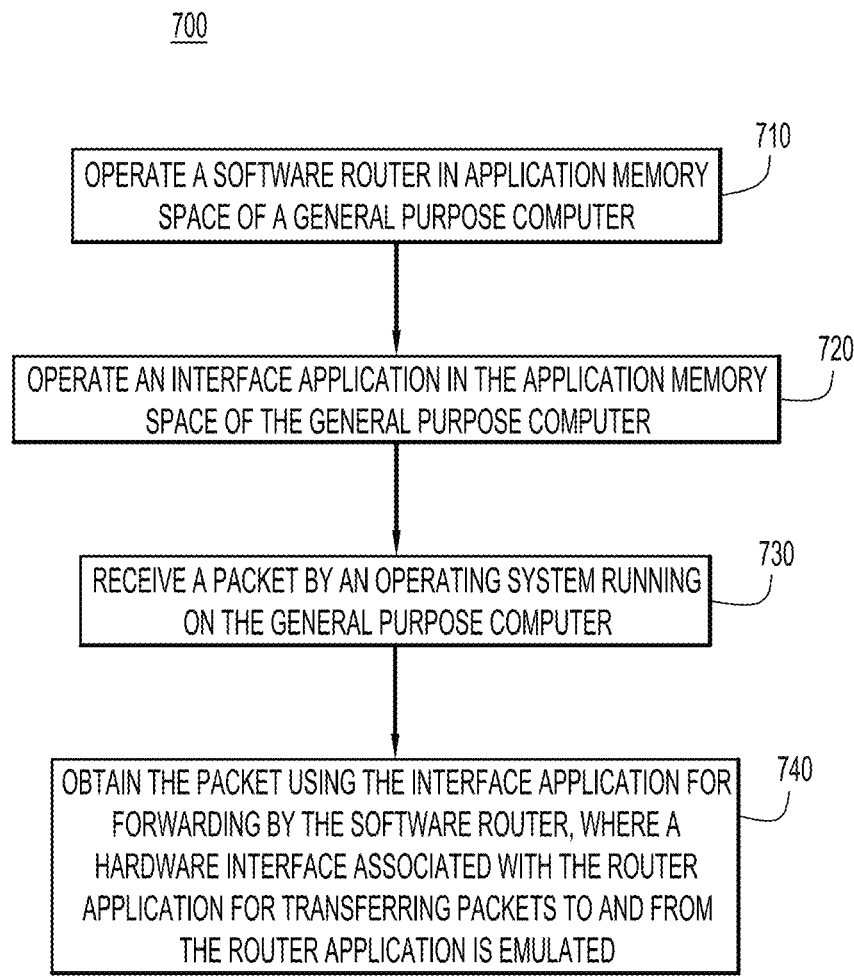
FIG. 7 is an example flow chart of a general process for operating a software router on a general purpose computer.

Turning now to FIG. 7, an example process flow chart is described for operating a software router on a general purpose computer, e.g., by way of software router application processes logic 700 (FIG. 4). At 710, a software router is operated in application memory space of a general purpose computer. At 720, an interface application is also operated in the application memory space of the general purpose computer. At 730, a packet is received by an operating system running on the general purpose computer. At 740, the packet is obtained using the interface application for forwarding by the software router, where a hardware interface associated with the router application for transferring packets to and from the router application is emulated by the interface application. The software router is, in general, designed for operation on an embedded device and is not reconfigured for operation on the general purpose computer. After the packet is received by the interface application, a software receive interrupt is generated that is configured to emulate a hardware interrupt of the embedded device. The general purpose computer is in communication with one or more of a wireline network, a wireless local area network (WLAN), a mobile WLAN, and a wireless wide area network (WWAN) to provide a flexible architecture for operating a software router.

Figure 8:
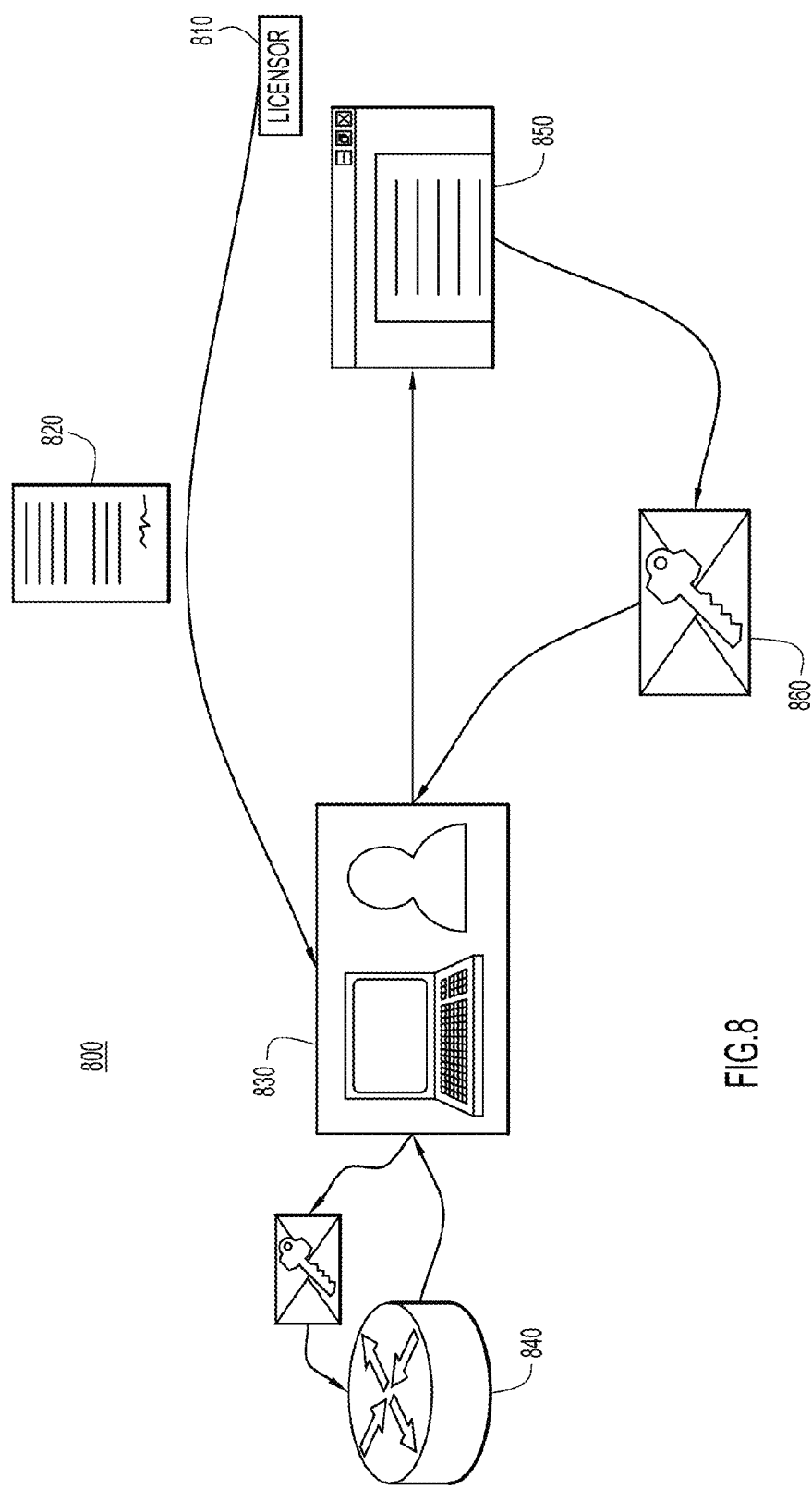
FIG. 8 is an example flow diagram for licensing a software router for use on a general purpose computer.

Referring to FIG. 8 an example flow diagram is described for licensing a software router for use on a general purpose computer. In general, the software router vendor implements measures to protect the software router from unauthorized use and illegal copying. One such avenue is to issue a software router license before a binary software router image will be enabled to operate its Ethernet interfaces and forward traffic. For example, the software router can utilize a perpetual node locked licenses. The final end users, e.g., a vehicle's owner and passengers, will not be able to update the software or license once the product containing the software router is deployed for its intended use. Different software router licenses may be issued based on the processing power of the hardware platforms they are intended to run on or may be based on the software router's feature set.

To implement a license on a general purpose computer that is unique, and therefore cannot be copied from one general purpose computer to another, a device may be identified with a Unique Device Identifier (UDI). For example, the UDI may consist of a Product Identifier (PID), which uniquely identifies a product (e.g., a software router version) and a Serial Number (SN), which uniquely identifies an instance of the product. In traditional router boxes the UDI information is typically stored in a secure identity Electrically Erasable Programmable Read-Only Memory (EEPROM) that might be used with a Trusted Computing Base (TCB).

Licensing may be managed by a licensing system to enable the ordering of a licensable feature on a particular software router product. In accordance with an embodiment, a customer purchases a Product Authorization Key (PAK) from the software router vendor when they intend to buy a license they can install on a hardware product. A PAK may be used to unlock sets software routers that may be bundled, e.g., by a series of consecutive serials numbers or for sets serial numbers that may form a set of stock units (SUs) that are a form of proof of purchase. A PAK is not tied to any particular device. The PAKs may be provided with or without an expiration date depending on the particular implementation.

A license file may be a prerequisite for installing a license on the hardware. The license file may be an electronic right-to-use a quantity of SUs to install on a particular device type. License SUs and the associated UDIs may be used, in one example, to obtain a license file from the software router vendor's licensing system. FIG. 8 summarizes a manual software router activation process 800. Referring to FIG. 8, at 810, a licensor determines that its company is ready to purchase, and at 820, the customer places a product order and completes any licensing or legal agreements that include the product's UDI for the product being activated. At 830, the licensor enters the UDI and PAK into the vendor's ordering system 850, either by the licensor or the vendor's representative. The software router vendor's database 840 tracks all UDIs and SUs for all software router products to prevent unauthorized license duplication or theft. At 860, one or more license files are sent to the customer, e.g., via email. The customer installs the license for the product.

One of the tasks that the software router application is faced with is how to uniquely identify each piece of hardware that it is installed on. In one embodiment, one software router license is required to be purchased for each piece of hardware device. One possible identifier is the universally administered (burned-in) MAC address of an Ethernet interface on the hardware device. One problem encountered with this approach is the retrieval of the burned-in address of an Ethernet interface is specific to the interface's chipset and there is no generic way to retrieve the burned-in address from a user space program in Linux. Another problem is that the interface chosen to represent the identity of the hardware device may not necessarily be present on every bootable instance of the device, not to mention the availability of MAC spoofing.

For other examples, most Intel based CPU boards contain BIOS information presented in the System Management BIOS (SMBIOS). This information contains serial numbers and/or identifiers for the system, chassis and processor in a hardware device. This information is not guaranteed to be unique between the different pieces of the same model of hardware. One model where using SMBIOS information can be used for node locking is to, e.g., contractually commit SIs to provide unique SMBIOS information for each device they plan to install software router on. This technique still does not prevent the system integrator from cloning software router installation between machines with identical SMBIOS information, but can deter efforts to clone installations outside the SI's environment. The SIs may be required to provide some sort of TCB, trusted platform module (TPM) or secure crypto-processor on the hardware devices planned for use with a software router.

As a software product that does not necessarily run on native embedded equipment, the software router does not have a trusted hardware source for obtaining the serial number required for a UDI. The licensing infrastructure can allow for a virtual UDI (vUDI) which is a UDI produced by a software-only product. The serial number portion of a vUDI can be the character '9' followed by 10 randomly generated alphanumeric characters. With $10^{36}$ (about 3.7 quadrillion) possible combinations for a virtual serial number, there should be enough randomness in generated vUDIs to avoid duplicates. In the rare case of a conflict with a previously licensed vUDI, the software router may allow the generation of additional vUDIs prior to license install. To maintain the vUDI in between reboots, the software router may store the vUDI in the NVRAM file used for the software router's non-volatile storage needs.

The presence of a TPM or secure crypto-processor would allow the ability to encrypt the license storage file or provide a secure license line store. As described above, performance level feature licenses are available for the software router. The performance level licensing can use a platform's bogomips values to measure the relative performance capabilities of that hardware device. Bogomips is an unscientific measurement of a processors CPU speed that is calculated by the Linux kernel when it boots up. The bogomips calculation in the kernel is meant to roughly characterize a processor's clock frequency as well as the effects of any CPU cache that may be present.

Although a processor's bogomips value is an imprecise measurement of the power of a processor complex, it is a universal measure on all Linux systems and is an available measurement for a user space program like the software router. Each physical CPU will have at least one bogomips value, two if it and the Linux kernel support hyper-threading. The software router can use the bogomips value found in the /etc/proc/cpuinfo virtual file as the value for the hardware device.

In one implementation, the software router licenses can prevent the software router from forwarding traffic on a hardware device that exceeds the allowed bogomips value(s). The device bogomips value will be validated at license install and the install will fail if the device reports a larger value than the license allows. Once the license is installed, the license will be validated against the device's reported bogomips value on every reboot. If the validation fails the software router may lock or not enable its interfaces. Since the bogomips values are computed early in the kernel initialization sequence, they should not vary too much between reboots.

Once a SI installs the software router binary file (i.e., the router application image) on a system, the SI may be required to install a license to use the product. At bootup, the software router will look to see if it has generated a vUDI from a prior boot and determine if there is valid license installed. If not, it will keep all its virtual interfaces in a 'down' state. If there is no vUDI present on the system, one will be randomly generated and presented to the internal licensing infrastructure when requested. The installer will be notified by a console message that the software router has no active license and no interfaces will be enabled. The installer can use an administrative command to retrieve the vUDI from the software router and use it for the license fulfillment process. Once the license is installed, the software router interfaces are allowed to forward packets.

In sum, the techniques described herein provide for operating a software router in application memory space of a general purpose computer and operating an interface application in the application memory space of the general purpose computer. In operation, a packet is received by an operating system running on the general purpose computer. The packet is obtained or captured using the interface application. A hardware interface associated with the router application for transferring packets to and from the router application is emulated by the interface application, i.e., the hardware interrupts are provided by software. The software router is, in general, designed for operation on an embedded device and is not reconfigured for operation on the general purpose computer. After the packet is received by the interface application, a software receive interrupt is generated that is configured to emulate a hardware interrupt of the embedded device. The general purpose computer is in communication with one or more of a wireline network, a WLAN, a mobile WLAN, and a WWAN to provide a flexible communication architecture for operating a software router.

Furthermore, in more complex networking environments, advanced security features, virtual private networking, Quality of Service (QoS), and service level agreement enforcement is desirable. Typically, advanced router features are only available for embedded routing platforms with dedicated hardware, hardware interfaces, and software-like processes that have been developed over decades. Adapting modern feature-rich embedded routers to a low-cost generic hardware platform to service a limited number of users is a task that requires considerable effort.

The above description is intended by way of example only.

What is claimed is:

1. A method comprising:
operating a software router in application memory space of a general purpose computer, the software router being configured to route data between (1) multiple Internet communication-enabled devices that are in communication with the general purpose computer and (2) a broadband interface of the general purpose computer, wherein the general purpose computer receives a packet via the broadband interface and transmits the packet to one of the multiple Internet communication-enabled devices;
operating a plurality of instances of an interface application in the application memory space of the general purpose computer;
receiving the packet by an operating system running on the general purpose computer;
monitoring a state of each of the instances of the interface application and communicating a detected state change to the software router; and
responsive to the detected state change, obtaining the packet using one of the instances of the interface application for forwarding by the software router;
wherein receiving comprises emulating a hardware interface associated with the router application for transferring packets to and from the router application,
wherein receiving further comprises performing a packet capture routine on the packet from a kernel of the operating system, and
wherein the packet capture routine places the packet in a receive ring buffer from which the packet is removed and thereafter replaced with a free buffer when the packet is processed for routing.

2. The method of claim 1, wherein the software router is designed for operation on an embedded device and not reconfigured for operation on the general purpose computer.

3. The method of claim 2, wherein receiving comprises receiving the packet by the interface application, and the method further comprising generating a receive software interrupt configured to emulate a hardware interrupt of the embedded device.

4. The method of claim 1, wherein the general purpose computer is in communication with wired and/or wireless network comprising one or more of wide area network (WAN), local area network (LAN) or personal area network (PAN).

5. The method of claim 1, wherein the interface application is configured to interface with a protected memory space of the operating system of the general purpose computer.

6. The method of claim 1, wherein the interface application includes a receive and a transmit process to interface with a protected memory space of the operating system of the general purpose computer.

7. The method of claim 6, further comprising:
adding received packets from the protected memory space into a receive queue of the receive process;
transferring received packets in the receive queue to the router application;
after transfer, routing by the router application;
transferring routed packets from the router application to a transmit queue of the interface application; and
transmitting packets in the transmit queue to the network.

8. The method of claim 7, wherein transferring comprises transferring packets via one of a packet capture application, a layer 2 network tap, direct memory access (DMA) or a raw packet socket.

9. The method of claim 7, wherein the routing comprises routing packets by way of Quality of Service (QoS) queues, a Virtual Private Network (VPN), and security policies associated with device communication.

10. The method of claim 1, further comprising:
determining whether the software router or the interface application has a valid license; and
disabling the software router or the interface application when a valid license is not installed on the general purpose computer.

11. A general purpose computer comprising:
a broadband network interface unit configured to enable network communications over a network and a short range network interface unit;
a memory;
a processor coupled to the broadband network interface unit, the short range network interface unit and to the memory, wherein the processor is configured to:
operate a software router in application memory space, the software router being configured to route data between multiple Internet communication-enabled devices that are in communication with the general purpose computer and the network interface, wherein the general purpose computer receives a packet via the broadband network interface unit and transmits the packet to one of multiple Internet communication-enabled devices via the short range network interface unit;
operate a plurality of instances of an interface application in the application memory space;
receive the packet by an operating system running on the general purpose computer;
monitor a state of each of the instances of the interface application and communicate a detected state change to the software router; and
responsive to the detected state change, obtain the packet using the interface application for forwarding by the software router;
wherein the processor emulates a hardware interface associated with the router application for transferring packets to and from the router application,
wherein the processor performs a packet capture routine on the packet from a kernel of the operating system, and
wherein the packet capture routine places the packet in a receive ring buffer from which the packet is removed and thereafter replaced with a free buffer when the packet is processed for routing.

12. The general purpose computer of claim 11, wherein the processor is configured to operate the software router designed for operation on an embedded device and not reconfigured for operation on the general purpose computer.

13. The general purpose computer of claim 12, wherein the processor is configured to receive the packet by the interface application and further configured to generate a receive software interrupt configured to emulate a hardware interrupt of the embedded device.

14. The general purpose computer of claim 11, wherein the processor is configure to operate the interface application configured to interface with a protected memory space of the operating system.

15. The general purpose computer of claim 14, wherein the processor is further configured to:
add received packets from the protected memory space into a receive queue of a receive process of the interface application;
transfer received packets in the receive queue to the router application;
after transfer, route by the router application;
transfer routed packets from the router application to a transmit queue of the interface application; and
transmit packets in the transmit queue to the network.

16. One or more non-transitory computer readable storage media encoded with software comprising computer executable instructions and when the software is executed operable to:
operate a software router in application memory space of a general purpose computer, the general purpose computer comprising a broadband network interface unit and a short range network interface unit, the software router being configured to route data between multiple Internet communication-enabled devices that are in communication with the general purpose computer and the broadband interface of the general purpose computer, wherein the general purpose computer receives a packet via the broadband network interface unit and transmits the packet to one of multiple Internet communication-enabled devices via the short range network interface unit;
operate a plurality of instances of an interface application in the application memory space;
receive the packet by an operating system running on the general purpose computer;
monitor a state of each of the instances of the interface application and communicate a detected state change to the software router; and
responsive to the detected state change, obtain the packet using the interface application for forwarding by the software router;
wherein the processor emulates a hardware interface associated with the router application for transferring packets to and from the router application,
wherein the processor performs a packet capture routine on the packet received from a kernel of the operating system, and
wherein the packet capture routine places the packet in a receive ring buffer from which the packet is removed and thereafter replaced with a free buffer when the packet is processed for routing.

17. The non-transitory computer readable storage media of claim 16, wherein the computer executable instructions, when executed are further operable to operate the software router designed for operation on an embedded device and not reconfigured for operation on the general purpose computer.

18. The non-transitory computer readable storage media of claim 17, wherein the computer executable instructions, when executed are further operable to receive the packet by the interface application and further configured to generate a receive software interrupt configured to emulate a hardware interrupt of the embedded device.

19. The non-transitory computer readable storage media of claim 16, wherein the processor is configure to operate the interface application configured to interface with a protected memory space of the operating system.

20. The non-transitory computer readable storage media of claim 19, wherein the computer executable instructions, when executed are further operable to:
- add received packets from the protected memory space into a receive queue of a receive process of the interface application;
- transfer received packets in the receive queue to the router application;
- after transfer, route by the router application;
- transfer routed packets from the router application to a transmit queue of the interface application; and
- transmit packets in the transmit queue to the network.

* * * * *